United States Patent
Cho et al.

(10) Patent No.: US 9,733,765 B2
(45) Date of Patent: Aug. 15, 2017

(54) DISPLAY APPARATUS AND METHOD FOR OPERATING THE SAME

(71) Applicant: LG ELECTRONICS INC., Seoul (KR)

(72) Inventors: Youngjun Cho, Seoul (KR); Munchae Joung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/668,588

(22) Filed: Mar. 25, 2015

(65) Prior Publication Data

US 2016/0034109 A1    Feb. 4, 2016

(30) Foreign Application Priority Data

Jul. 30, 2014  (KR) ........................ 10-2014-0097316

(51) Int. Cl.
G06F 3/042 (2006.01)
G06F 1/16 (2006.01)
G06F 3/041 (2006.01)

(52) U.S. Cl.
CPC .............. *G06F 3/0428* (2013.01); *G06F 1/16* (2013.01); *G06F 3/0412* (2013.01); *G06F 3/0421* (2013.01); *G06F 2203/04109* (2013.01)

(58) Field of Classification Search
CPC ................. G06F 3/0428; G06F 3/0421; G06F 2203/04109; G06F 3/0412
USPC ...................... 178/18.01–19.07; 345/173–178
See application file for complete search history.

(56) References Cited

U.S. PATENT DOCUMENTS

2011/0080344 A1    4/2011  Dura et al.

FOREIGN PATENT DOCUMENTS

| JP | 2009-116586 | 5/2009 |
| JP | 2013-058084 | 3/2013 |
| JP | 2014-513375 | 5/2014 |
| KR | 10-1081318 | 11/2011 |
| WO | 2013/138003 | 9/2013 |

OTHER PUBLICATIONS

European Patent Office Application Serial No. 15160300.8, Search Report dated Oct. 29, 2015, 8 pages.
Korean Intellectual Property Office Application Serial No. 10-2014-0097316, Notice of Allowance dated Oct. 20, 2015, 2 pages.
Korean Intellectual Property Office Application Serial No. 10-2014-0097316, Office Action dated Jul. 21, 2015, 5 pages.

*Primary Examiner* — Michael Pervan
(74) *Attorney, Agent, or Firm* — Lee, Hong, Degerman, Kang & Waimey

(57) ABSTRACT

Disclosed herein is a display apparatus including a curved display module having a curved surface bent in a y-axis direction, a surface overlay disposed on the front surface of the curved display module and having a refractive index differing from an air layer, at least one IR emitter arranged on the upper long side or the lower long side of the surface overlay and emitting IR light, and at least one first IR receiver arranged on the long side opposite the at least one first IR emitter and receiving the IR light emitted by the at least one IR emitter. The curved display apparatus may more accurately and effectively recognize touch input and thus, user convenience may be improved.

11 Claims, 14 Drawing Sheets

DISPLAY APPARATUS AND METHOD FOR OPERATING THE SAME

CROSS-REFERENCE TO RELATED APPLICATION

Pursuant to 35 U.S.C. §119(a), this application claims the benefit of earlier filing date and right of priority to Korean Patent Application No. 10-2014-0097316, filed on Jul. 30, 2014, the contents of which are hereby incorporated by reference herein in its entirety.

BACKGROUND OF THE INVENTION

1. Field of the invention

The present invention relates to a display apparatus and a method for operating the same and, more particularly, to a method for more accurately and effectively recognizing touch in a display apparatus having a curved display panel.

2. Description of the Related Art

Various display apparatuses forming images are used. For example, there are various display apparatuses, such as a liquid crystal display panel, a plasma display panel, an organic light emitting diode display panel, etc.

As application fields of display apparatuses are gradually increased, various characteristics in respective application fields are required and demands in consideration of three-dimensional effects and immersiveness as well as characteristics regarding display of an image increase. In order to satisfy these various demands, research on various types of the structures of the display apparatuses, such as a variable type display, a flexible display, etc., has been carried out.

Further, according to various structures of display apparatuses, research on more convenient and accurate user interfaces, touch recognition methods, voice recognition methods, etc., increases.

FIGS. 1(a) and 1(b) are views illustrating conventional touch recognition methods of display apparatuses and more particularly, illustrating IR type touch recognition methods.

An IR type uses a characteristic in that infrared light has straightness and is blocked by an obstacle.

With reference to FIGS. 1(a) and 1(b), light emitting elements 10 and light receiving elements 20 may be arranged around a display panel or a substrate 90 and thus detect a user touch position.

With reference to FIGS. 1(a) and 1(b), the light emitting elements 10 and the light receiving elements 20 may be disposed so as to be opposite each other. As exemplarily shown in FIG. 1(a), the light emitting elements 10 may be aligned in a line and the light receiving elements 20 may be aligned in a line or, as exemplarily shown in FIG. 1(b), the light emitting elements 10 and the light receiving elements 20 may be alternately aligned.

The light emitting elements 10 emit infrared light. When a user touches a designated point on the substrate 90 using a finger or a pen, the light receiving element 20 at the corresponding point from among the light receiving elements arranged opposite the light emitting elements 10 may block infrared light emitted from the light emitting elements 10.

Thereby, infrared light, emitted from the light emitting elements 10, may be prevented from reaching the light receiving elements 20. Therefore, a touch position may be recognized by detecting a position at which infrared light is blocked.

In such a touch position recognition method, if the number of the light emitting elements 10 and the number of the light receiving elements 20 are increased to improve accuracy in recognition of the touch position, manufacturing costs are raised and, in case of a curved display apparatus, accuracy in touch recognition is not secured.

SUMMARY OF THE INVENTION

An object of the present invention is to provide a display apparatus and a method for operating the same which may display an image of a wide viewing angle and high quality.

Another object of the present invention is to provide a display apparatus and a method for operating the same which may more accurately and effectively recognize touch input.

The objects of the present invention are not limited to the above-mentioned objects and other objects that have not been mentioned above will become evident to those skilled in the art from the following description.

To achieve the above objects, there is provided a display device including a curved display module having a curved surface bent in a y-axis direction, a surface overlay disposed on the front surface of the curved display module and having a refractive index differing from an air layer, at least one IR emitter arranged on the upper long side or the lower long side of the surface overlay and emitting IR light, and at least one first IR receiver arranged on the long side opposite the at least one IR emitter and receiving the IR light emitted by the at least one IR emitter.

To achieve the above objects, there is provided a method for operating a display apparatus having a curved display module having a curved surface bent in a y-axis direction, including receiving first light from among IR light, emitted by at least one IR emitter, through at least one first IR receiver, receiving second light having an optical path differing from the first light from among IR light, emitted by the at least one IR emitter, through second IR receivers, calculating an x-axis coordinate of a touch position based on change of the quantity of light received by the at least one first IR receiver, and calculating a y-axis coordinate of the touch position based on change of the quantity of light received by the second IR receivers.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EMBODIMENTS

Figure 1A:
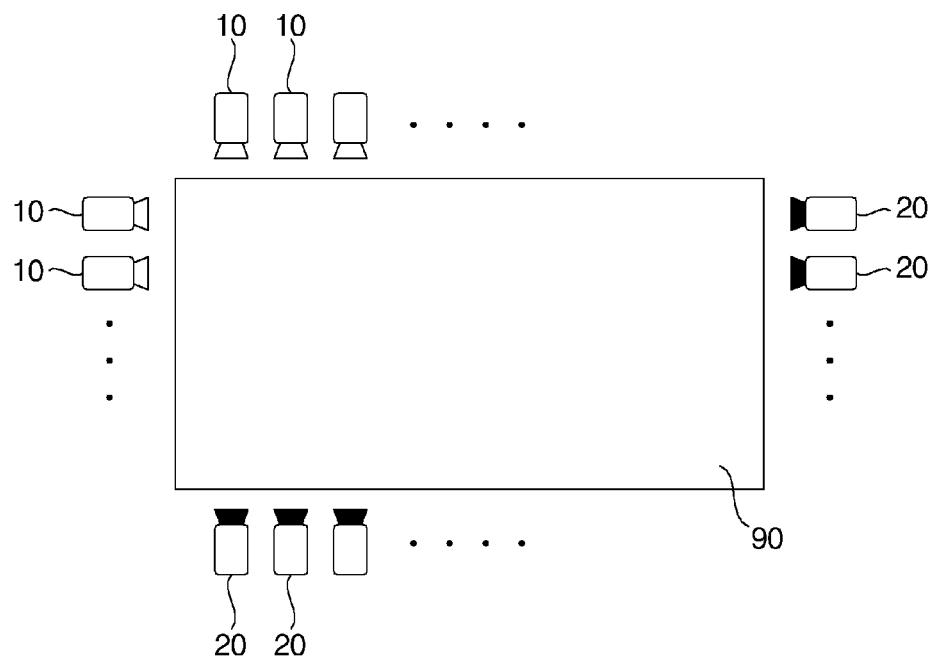
FIGS. 1(a) and 1(b) are views illustrating conventional touch recognition methods of display apparatuses.
Figure 1B:
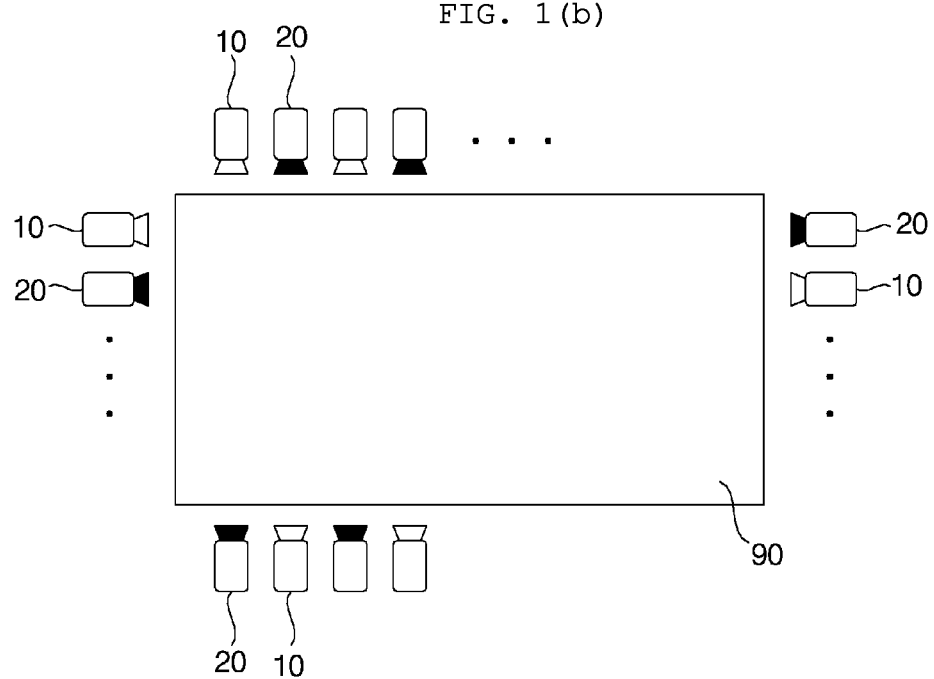

The advantages and features of the present invention, and the way of attaining them, will become apparent with reference to embodiments described below in conjunction with the accompanying drawings.

In the following description of the present invention, a detailed description of known functions and configurations incorporated herein will be omitted when it may make the subject matter of the present invention rather unclear. Wherever possible, the same reference numbers will be used throughout the drawings to refer to the same or like parts. In the drawings, thicknesses, dimensions, etc. may be exaggerated or reduced for clarity and embodiments of the present invention are not limited thereto.

Further, in the specification, if a part "includes" another part, it will be understood that the part does not exclude other parts and may further include other parts as long as there is no opposing statement. Further, it will be understood that when a part, such as an element, a layer, film, region or substrate, is referred to as being "on" another part, it can be directly on the other part or intervening parts may also be present. It will be understood that when a part, such as an element, a layer, film, region or substrate, is referred to as being "directly on" another part, there is no intervening part.

The suffixes "module" and "unit" in elements used in description below are only given in consideration of ease in preparation of the specification and do not provide specific meanings or functions. Therefore, the suffixes "module" and "unit" may be used together.

Hereinafter, display apparatuses in accordance with embodiments of the present invention will be descried in detail with reference to the accompanying drawings.

Figure 2A:
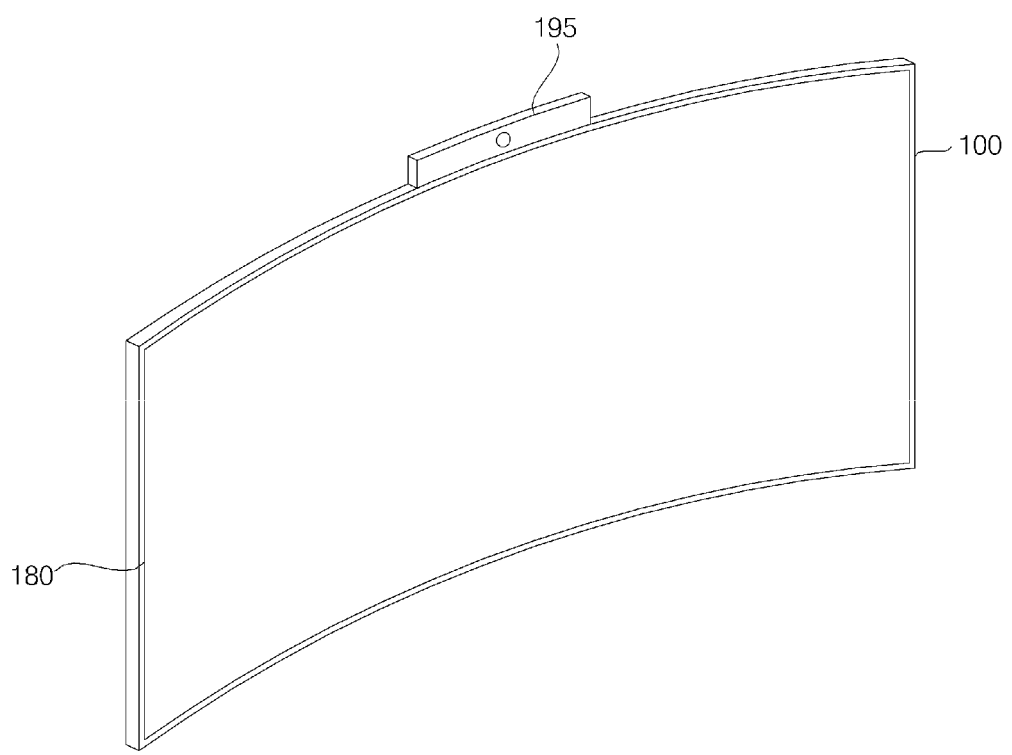
FIGS. 2A, 2B and 2C are exemplary views illustrating curved display apparatuses in accordance with embodiments of the present invention.
Figure 2B:
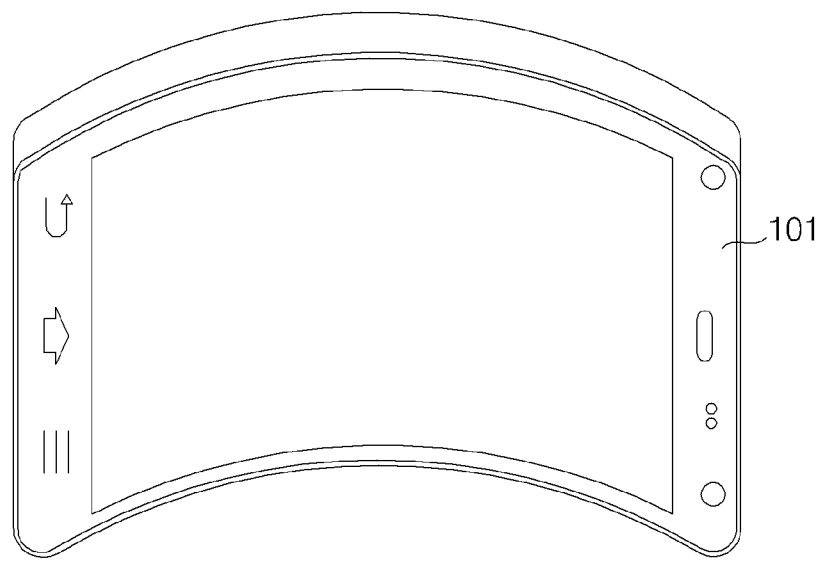
Figure 2C:
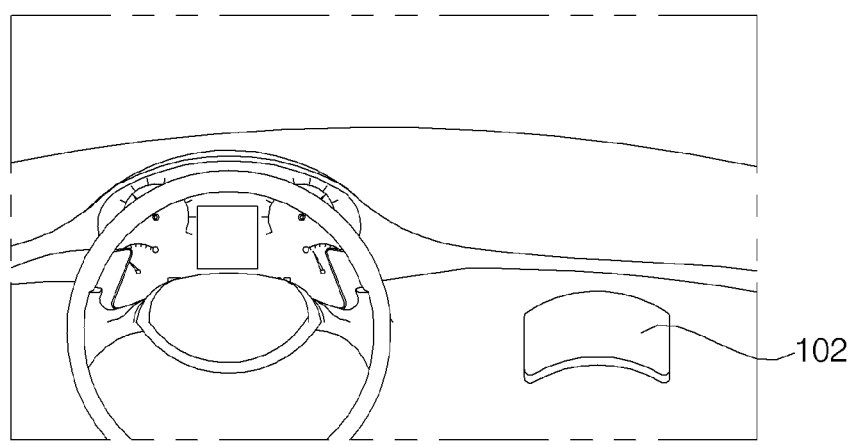
Figure 3:
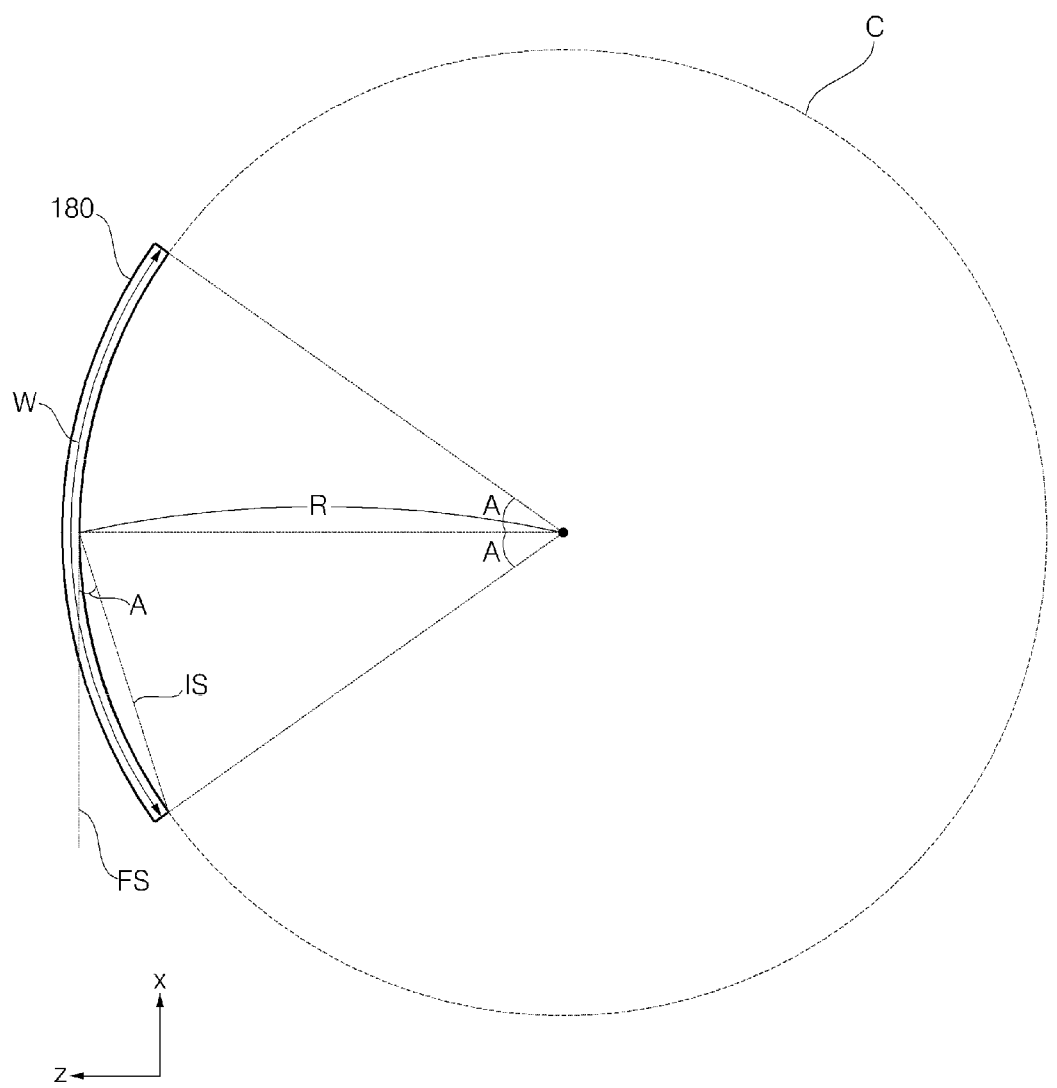
FIG. 3 is a plan view of a display module of the display apparatus of FIG. 2A.

FIGS. 2A to 2C are exemplary views illustrating curved display apparatuses in accordance with embodiments of the present invention and FIG. 3 is a plan view of a display module of the display apparatus of FIG. 2A.

A display apparatus described in the specification may be a fixed display apparatus, such as a home or industrial digital TV 100, a desktop computer, or a digital signage, as exemplarily shown in FIG. 2A.

Further, the display apparatus described in the specification may be a mobile terminal 101, such as a smartphone, a laptop computer, a personal digital assistant (PDA), a portable multimedia player (PMP), a slate PC, a tablet PC, or an ultrabook, as exemplarily shown in FIG. 2B.

Further, the display apparatus described in the specification may be an apparatus included in or operated in connection with other apparatuses or structures, such as a navigation apparatus 102 for vehicles, as exemplarily shown in FIG. 2C.

Hereinafter, a home or industrial display apparatus of FIG. 2A will be exemplarily described but embodiments of the present invention are not limited thereto.

With reference to FIG. 2A, a display apparatus 100 in accordance with this embodiment of the present invention includes a display module 180 displaying an image.

The display apparatus 100 may include a camera 195 and various sensors (not shown) according to embodiments.

The display module 180 in accordance with this embodiment may be a curved display module having a screen which is generally curved (bent). In more detail, the display module 180 may be curved so that the screen of the display module 180 has a designated radius of curvature R. Thereby, the display module 180 has a shape in which both side surfaces of the display module 180 protrude in the direction of a user and the central portion of the display module 180 is concave. Then, a distance from user's eyes to the display module 180 is regular throughout the entirety of the display module 180.

Conventionally, since a distance from the user's eyes to the side portions of the display module 180 is longer than a distance from user's eyes to the central portion of the display module 180, recognizability of the side portions of the display module 180 is lowered and blurring may occur at side portions of the display module 180.

On the other hand, in this embodiment, distances from user's eyes to the central portion and side portions of the display module 180 are uniform and thus, 3-dimensional effects of the screen may be improved. Thereby, user immersiveness may be improved.

In this embodiment, the radius of curvature R of the display module 180 is within a designated range and thus, immersiveness and stability of the display module 180 may be improved. The radius of curvature R of the display module 180 may have a value changed according to the screen size (for example, the horizontal length of the screen) and the protruding ratio of the side portions to the central portion of the display module 180. With reference to FIG. 2, this will be described in more detail.

The protruding ratio of the side portions to the central portion of the display module 180 may be defined as an angle A between a flat surface FS extending from the central portion of the display module 180 and an inclined surface IS extending from the central portion to the side portion of the display module 180. Since a virtual circle C having the radius of curvature R of the display module 180 and the inclined surface IS meet at the right angle, a fan shape having an arc formed by the display module 180 on the virtual circle C has a central angle of 2A.

Here, a ratio of the horizontal length W of the display module 180 to the central angle 2A and a ratio of the circumferential length of the virtual circle C to the overall angle (360 degrees) are the same, as stated in Equation 1 below.

$$2A{:}W{=}360{:}2\pi R \qquad \text{[Equation 1]}$$

Then, the radius of curvature $R_A$ of the display module 180 according to the horizontal length W of the display module 180 at a designated angle A is defined as follows.

$$R_A{=}(360W)/\{(2\pi){\cdot}(2A)\} \qquad \text{[Equation 2]}$$

In this embodiment, if the radius of curvature R of the display module 180 may have a value between a radius of curvature $R_5$ (hereinafter, referred to as a 5 degree radius of curvature) if the side portions of the display module 180 protrude by 5 degrees as compared to the central portion of the display module 180 and a radius of curvature $R_{15}$ (hereinafter, referred to as a 15 degree radius of curvature) if the side portions of the display module 180 protrude by 15 degrees as compared to the central portion of the display module 180. If the radius of curvature R of the display module 180 is less than the 5 degree radius of curvature $R_5$, it may be difficult to uniformly maintain the distances from user's eyes to the central portion and side portions of the display module 180. If the radius of curvature R of the display module 180 is greater than the 15 degree radius of curvature $R_{15}$, the radius of curvature R of the display module 180 is excessively large and may thus provide inconvenience to users and lower stability of the display module 180.

According to Equation 2, the 5 degree radius of curvature $R_5$ is about 5.8W and the 15 degree radius of curvature $R_{15}$ is about W. Therefore, the ratio of the radius of curvature R to the horizontal length W of the display module 180 in accordance with this embodiment may be about 1.9 times to 5.8 times. In such a manner, in this embodiment, the radius of curvature R to the horizontal length W of the display module 180 is restricted and thus, user immersiveness may be improved and stability of the display module 180 may be improved.

For example, the display module 180 may include an organic light emitting display panel using organic light emitting devices OLEDs.

The organic light emitting display panel is a self-light emitting display module using a principle that current flows in fluorescent or phosphor organic thin films so that electrons and holes are combined in the organic thin films and thus generate light. The organic light emitting display panel has various advantages, such as a bright and clear image having high quality, no restriction as to a viewing angle, and low power consumption.

Particularly, since the organic light emitting display panel may be manufactured by stacking the organic thin films and thus have flexible characteristics, the organic light emitting display panel may have a regular radius of curvature R. However, embodiments of the present invention are not limited thereto and display modules having various structures and employing various methods may be applied to embodiments of the present invention.

Figure 4:
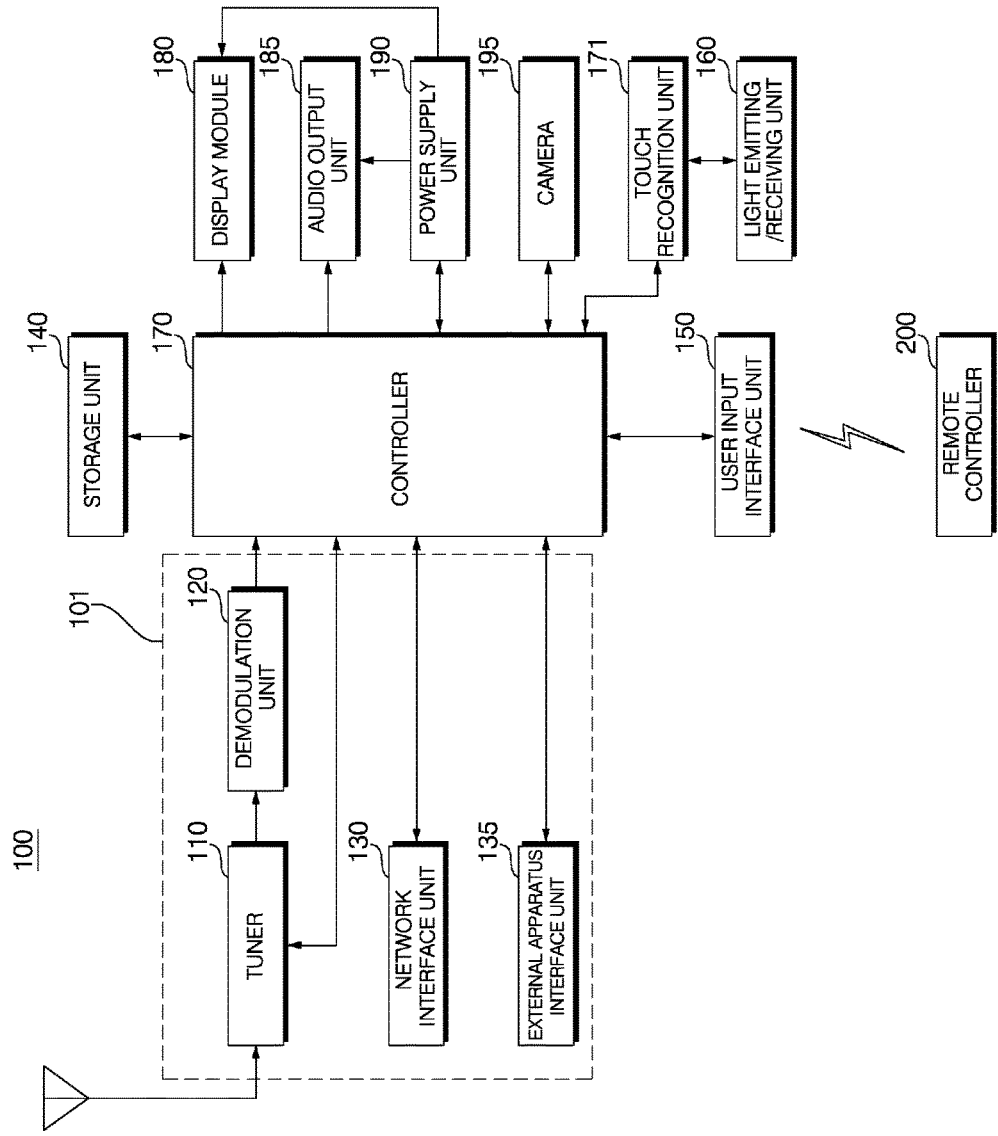
FIG. 4 is a block diagram illustrating the internal configuration of the display apparatus of FIG. 2A.

FIG. 4 is a block diagram illustrating the internal configuration of the display apparatus of FIG. 2A.

With reference to FIG. 4, a display apparatus 100 in accordance with one embodiment of the present invention may include an image reception unit 101, a storage unit 140, a user input interface unit 150, a controller 170, a display module 180, an audio output unit 185, and a power supply unit 190.

The display apparatus 100 in accordance with this embodiment may further include a touch recognition unit 171 and a light emitting/receiving unit 170.

According to embodiments, the display apparatus 100 may further include a camera 195.

The image reception unit 101 receives an image input from the outside. In more detail, the image reception unit 101 may include a tuner 110, a demodulation unit 120, a network interface unit 130, and an external apparatus interface unit 135.

The tuner 110 may select a broadcast signal corresponding to a channel selected by a user or broadcast signals corresponding to all channels which are stored in advance, from among broadcast signals received through an antenna. Further, the tuner 110 may convert the selected signals into intermediate frequency signals, baseband images, or voice signals.

The demodulation unit 120 may perform a demodulation or channel decoding operation by receiving a digital IF (DIF) signal converted by the tuner 110.

The demodulation unit 120 may output a stream signal (TS) after demodulation or channel decoding. Here, the stream signal (TS) may be a signal in which image signals, voice signals or data signals are multiplexed. The stream signal (TS) output from the demodulation unit 120 may be input to the controller 170. The controller 170 may perform demultiplexing, image/voice signal processing, and then output an image to the display module 180 and voice to the audio output unit 185.

The external apparatus interface unit 135 may connect the display apparatus 100 to an external apparatus. For this purpose, the external apparatus interface unit 135 may include an A/V input/output unit (not shown).

The external apparatus interface unit 135 may be connected to external apparatuses, such as a digital versatile disc, a BluRay player, a game console, a camera, a camcorder, a computer (notebook), and a settop box, by wire or wirelessly and perform input/output operations with the external apparatuses.

The A/V input/output unit may include a USB terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc., so as to input image and voice signals from an external apparatus to the display apparatus 100.

Further, the external apparatus interface unit 135 may be connected to various settop boxes through at least one of the above-described terminals and thus perform input/output operations with the settop boxes.

The network interface unit 130 may provide an interface for connecting the display apparatus 100 to a wired/wireless network including an Internet protocol network. For example, the network interface unit 130 may receive contents or data provided by an Internet or content provider or a network operator through the network.

The network interface unit 130 may include a wired communication unit (not shown) or a wireless communication unit (not shown).

The wireless communication unit may perform short-range wireless communication with other electronic apparatuses. The display apparatus 100 may be connected to other electronic apparatuses through a network according to communication protocols, such as Bluetooth, radio frequency identification (RFID), infrared data association (IrDA), ultra wideband (UWB), ZigBee, digital living network alliance (DLNA), etc.

The storage unit 140 may store programs to process and control respective signals in the controller 170 and store processed image, voice, or data signals.

Further, the storage unit 140 may perform a function of temporarily storing image, voice, or data signals input from the external apparatus interface unit 135 or the network interface unit 130. Further, the storage unit 140 may store information regarding a designated broadcast channel through a channel memory function.

The display apparatus 100 may reproduce content files (a moving picture file, a still image file, a music file, a document file, an application file, etc.) to provide these content files to users.

Although FIG. 4 illustrates an embodiment in which the storage unit 140 is provided separately from the controller 170, embodiments of the present invention are not limited thereto. The storage unit 140 may be included in the controller 170.

The user input interface unit 150 transmits a signal, input by a user, to the controller 170 or transmits a signal from the controller 170 to the user.

For example, the user input interface unit 150 may transmit/receive a user input signal to turn power on/off, to select a channel, or to set a screen to/from a remote controller 200, transmit a user input signal input through a local key (not shown), such as a power key, a channel key, a volume key, or a setup key, to the controller 170, transmit a user input signal input from a sensor unit (not shown) sensing a user gesture to the controller 170, and transmit a signal from the controller 170 to the sensor unit (not shown).

The controller 170 may demultiplex a stream input through the tuner 110, the network interface unit 130, or the external apparatus interface unit 135 or process demultiplexed signals, and thus generate and output a signal to output an image or voice.

An image signal processed by the controller 170 may be input to the display module 180 and displayed as an image corresponding to the image signal. Further, the image signal processed by the controller 170 may be input to an external output apparatus through the external apparatus interface unit 135.

A voice signal processed by the controller 170 may be output to the audio output unit 185. Further, the voice signal processed by the controller 170 may be input to an external output apparatus through the external apparatus interface unit 135.

Although not shown in FIG. 4, the controller 170 may include a demultiplexing unit, an image processing unit, etc. These will be described later with reference to FIG. 5.

The controller 170 may control overall operation of the display apparatus 100. For example, the controller 170 may control the tuner 110 so as to tune to an RF broadcast corresponding to a channel selected by the user or a channel which is stored in advance.

Further, the controller 170 may control the display apparatus according to a user command input through the user input interface unit 150 or an internal program. Particularly, the controller 170 may download an application or an application list desired by a user in the display apparatus 100 through the network.

The controller 170 may control the display module 180 so as to display an image. The image displayed on the display module 180 may be a still image or a moving picture, and be a 2D image or a 3D image.

The controller 170 may recognize a user position based on an image captured by the camera 195. For example, the controller 170 may recognize a distance between a user and the display apparatus 100 (a z-axis coordinate value). In addition, the controller 170 may recognize an x-axis coordinate value and a y-axis coordinate value corresponding to the user position.

The display module 180 respectively converts an image signal, a data signal, or an OSD signal, processed by the controller 170, or an image signal, a data signal, or an OSD signal, processed by the external apparatus interface unit 135, into R, G, and B signals and thus generates a driving signal.

The display module 180 may be a PDP, an LCD, an OLED, or a 3D display.

The display module 180 may be a touchscreen which may be used as an input apparatus as well as an output apparatus.

The display module 180 in accordance with one embodiment of the present invention may be a curved display module. For example, the display module 180 may be a flexible display module.

The audio output unit 185 may receive a voice signal processed by the controller 170 and thus output voice.

The power supply unit 190 supplies corresponding power to the entirety of the display apparatus 100. Particularly, the power supply unit 190 may supply power to the controller 170 which may be implemented as a system on chip (SOC), the display module 180 to display an image, and an audio output unit 185 to output audio.

For this purpose, the power supply unit 190 may include a converter (not shown) converting AC power into DC power.

The camera 195 captures an image and transmits the captured image to the controller 170. Operation of the camera 195 may be controlled by the controller 170. A plurality of cameras 195 may be provided. If a plurality of cameras 195 is provided, a first view image and a second view image may be captured. Thereby, the controller 170 may calculate a distance between a user and the display apparatus 180.

The camera 195 may include various types of cameras, such as an infrared camera, in addition to an RGB camera.

The remote controller 200 may transmit user input to the user input interface unit 150. For this purpose, the remote controller 200 may use a radio frequency (RF) communication method, an infrared (IR) communication method, a Bluetooth method, an ultra wideband (UWB) method, or a ZigBee method.

Further, the remote controller 200 may receive image, voice, or data signals output from the user input interface unit 150 and display the received image, voice, or data signals or output voice or vibration.

The remote controller 200 may transmit coordinate value information corresponding to motion of the remote controller 200 to the display apparatus 100. Thereby, a pointer corresponding to motion of the remote controller 200 may be displayed on a display of the display apparatus. Since the corresponding pointer moves according to motion of the remove controller 200 in a 3D space and is displayed in such a manner, the remote controller 200 may be referred as a 3D pointing device.

The light emitting/receiving unit 160 may include light emitting elements and light receiving elements for touch recognition, and the touch recognition unit 171 may recognize the position of touch applied from the outside based on the quantity of light received by the light emitting/receiving unit 160, particularly, the light receiving elements.

A detailed description of recognition of the touch position will be given later with reference to FIGS. 6 to 17.

FIG. 4 is a block diagram of the display apparatus 100 in accordance with one embodiment of the present invention. Respective elements in the block diagram may be combined, added, or omitted according to specifications of the display apparatus 100 as actually embodied. That is, two or more elements may be combined into one element or one element may be divided into two or more elements, as needed. Further, functions performed by respective blocks describe this embodiment of the present invention, and detailed operations of devices thereof do not limit the scope of the invention.

Differently from FIG. 4, the display apparatus 100 does not include the tuner 110 and the demodulation unit 120 shown in FIG. 4 and may receive a broadcast image through the network interface unit 130 or the external apparatus interface unit 135 and then reproduce the broadcast image.

Further, differently from FIG. 4, the display apparatus 100 does not include the touch recognition unit 171 shown in FIG. 4 and the controller 170 may perform calculation and control required for touch recognition. Otherwise, the touch recognition unit 171, the light emitting/receiving unit 160, and a separate power supply unit (not shown) may form a touch panel.

Figure 5:
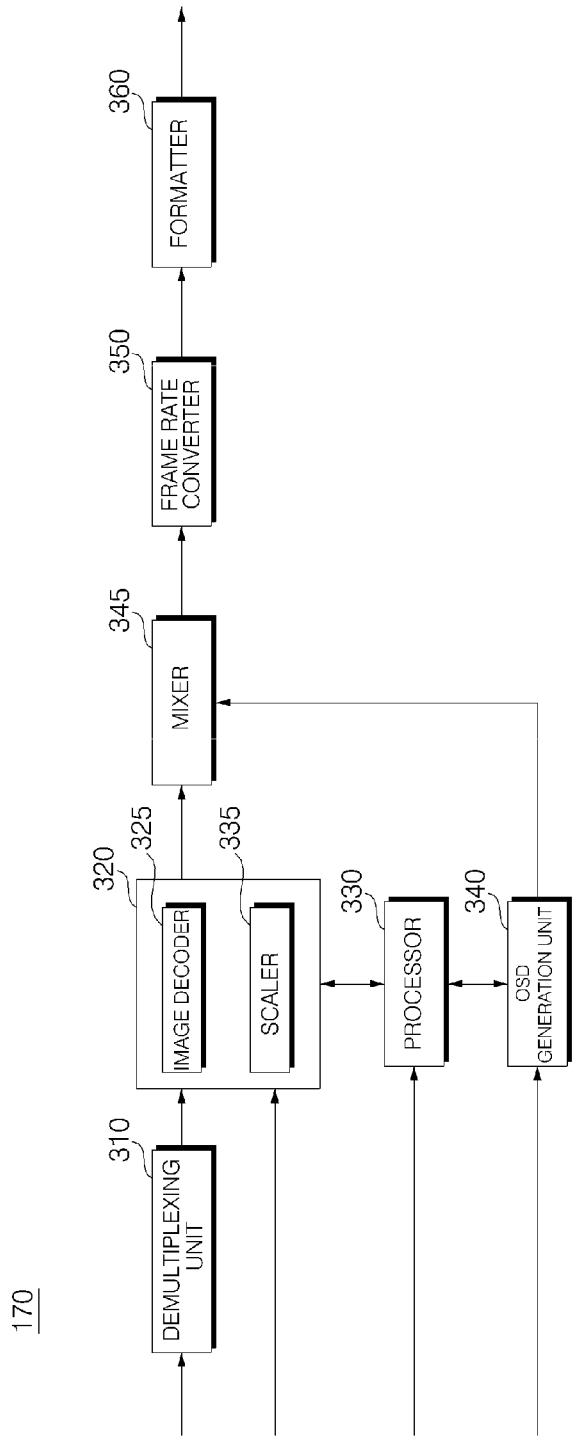
FIG. 5 is a block diagram illustrating the internal configuration of a controller of FIG. 4.

FIG. 5 is a block diagram of the controller of FIG. 4.

With reference to FIG. 5, the controller 170 in accordance with one embodiment of the present invention may include a demultiplexing unit 310, an image processing unit 320, an OSD generation unit 340, a mixer 350, a frame rate converter 350, and a formatter 360. The controller 170 may further include a voice processing unit (not shown) and a data processing unit (not shown).

The demultiplexing unit 310 demultiplexes an input stream. For example, if a stream MPEG-2 TS is input, the demultiplexing unit 310 demultiplexes the stream MPEG-2 TS into image, voice, and data signals. Here, a stream signal input to the demultiplexing unit 310 may be a stream signal output from the tuner 110, the demodulation unit 120, or the external apparatus interface unit 135.

The image processing unit 320 may perform image processing of the demultiplexed image signals. For this purpose, the image processing unit 320 may include an image decoder 325 and a scaler 335.

The image decoder 325 decodes the demultiplexed image signals and the scaler 335 scales the resolution of the decoded image signals so that the image signals may be output from the display module 180.

The image decoder 325 may be one of decoders having various standards.

The image signals decoded by the image processing unit 320 are input to the mixer 350.

A processor 330 may control overall operation of the display apparatus 100 or the controller 170. For example, the processor 330 may control the tuner 110 so as to tune to an RF broadcast corresponding to a channel selected by the user or a channel which is stored in advance.

Further, the processor 330 may control the display apparatus 100 according to a user command input through the user input interface unit 150 or an internal program.

Further, the processor 330 may perform data transmission control with the network interface unit 135 or the external apparatus interface unit 130.

Further, the processor 330 may control operations of demultiplexing unit 310, the image processing unit 320, the OSD generation unit 340, etc. in the controller 170.

The OSD generation unit 340 may generate an OSD signal according to user input or spontaneously. For example, the OSD generation unit 340 may generate a signal to display various pieces of information as graphics or text on the screen of the display module 180 based on a user input signal or a control signal. The generated OSD signal may include various pieces of data, such as a user interface picture, various menu pictures, widgets, icons, etc.

For example, the OSD generation unit 340 may generate a signal to display broadcast information based on a caption or an EPG of a broadcast image.

The OSD generation unit 340 generates an OSD signal or a graphic signal and may thus be referred to as a graphic processing unit.

The mixer 345 may mix the OSD signal generated by the OSD generation unit 340 and the decoded image signals processed by the image processing unit 220. The mixed signal may be provided to the formatter 360. By mixing the decoded broadcast image signals or the external input signal and the OSD signal, an OSD may be overlaid on a broadcast image or an external input image.

The frame rate converter (FRC) 350 may convert the frame rate of an input image. The FRC 350 may output the input image without separate conversion of the frame rate thereof.

The formatter 360 receives a signal output from the FRC 350, changes the format of the signal so as to be suitable for the display module 180, and then outputs the signal. For example, the formatter 360 may output R, G, and B data signals and these R, G, and B data signals may be output through low voltage differential signaling (LVDS) or mini-LVDS.

The formatter 360 may change the format of a 3D image signal or convert a 2D image into a 3D image.

The voice processing unit (not shown) in the controller 170 may perform voice processing of demultiplexed voice signals. For this purpose, the voice processing unit (not shown) may include various decoders.

Further, the voice processing unit (not shown) in the controller 170 may process base, treble, volume, etc.

The data processing unit (not shown) in the controller 170 may perform data processing of demultiplexed data signals. For example, if demultiplexed data signals are coded data signals, the data processing unit may decode the coded data signals. The coded data signals may be electronic program guide (EPG) information including broadcast information, such as start times, end times, etc. of broadcast programs televised on respective channels.

FIG. 5 is a block diagram of the controller 170 in accordance with one embodiment of the present invention. Respective elements in the block diagram may be combined, added, or omitted according to specifications of the controller 170 as actually embodied.

Particularly, the frame rate converter 350 and the formatter 360 are not provided in the controller 170 but may be provided separately.

Figure 6:
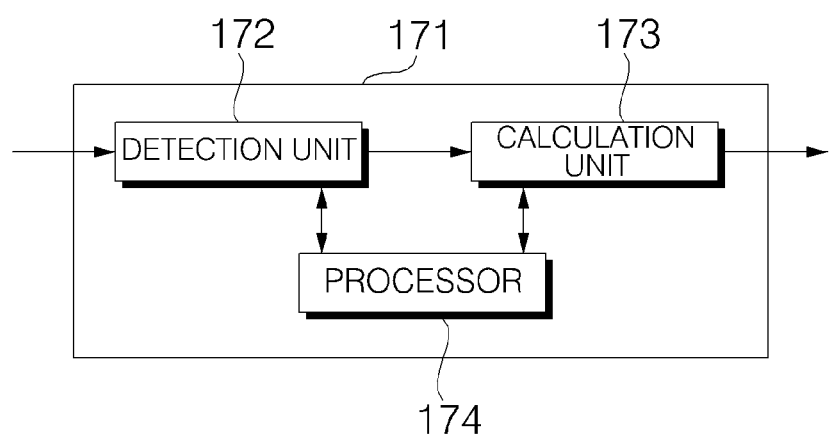
FIG. 6 is a block diagram illustrating the internal configuration of a touch recognition unit of FIG. 4.

FIG. 6 is a block diagram illustrating the internal configuration of the touch recognition unit of FIG. 4.

The light emitting elements (emitters) of the light emitting/receiving unit 160 emit infrared light and the emitted infrared light reaches the light receiving elements (receivers) of the light emitting/receiving unit 160. Infrared light has straightness and is blocked by an obstacle and thus, the quantity of light received by the light receiving elements is varied according to whether or not there is touch.

A detection unit 172 may acquire optical data by the light emitting elements and the light receiving elements. Particularly, the detection unit 172 may acquire the quantity of light received by a plurality of light receiving elements.

A calculation unit 173 may calculate data acquired by the detection unit 172 and thus recognize the position of touch applied from the outside.

A processor 174 may control overall operation of the touch recognition unit 171 and output recognized touch position coordinates to the controller 170.

According to embodiments, the processor 174 may control operation of the light emitting elements and the light receiving elements. For example, the processor 174 may turn on a plurality of light emitting elements and a plurality of light receiving elements on based on a designated rule or setup.

FIG. 6 is a block diagram of the touch recognition unit 171 in accordance with one embodiment of the present invention. Respective elements in the block diagram may be combined, added, or omitted according to specifications of the touch recognition unit 171 as actually embodied. Further, the touch recognition unit 171 is not separately provided and may be combined with the controller 170.

Hereinafter, a touch recognition method of a display apparatus in accordance with one embodiment of the present invention will be described in more detail with reference to the accompanying drawings.

Figure 7:
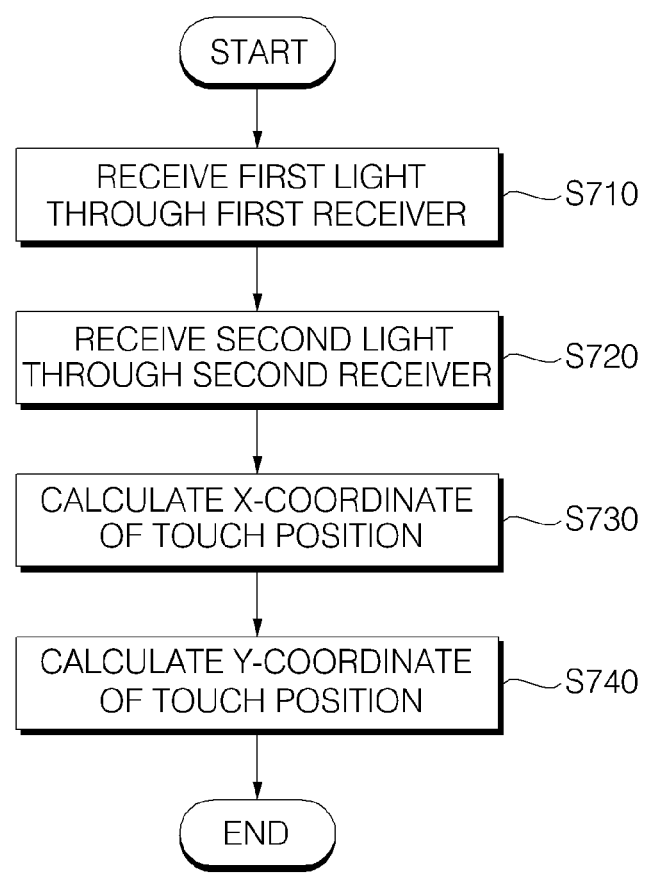
FIG. 7 is a flowchart illustrating a method for operating a display apparatus in accordance with one embodiment of the present invention.

FIG. 7 is a flowchart illustrating a method for operating a display apparatus in accordance with one embodiment of the present invention and FIGS. 8 to 17 are views illustrating the structures of display apparatuses and methods for operating the same in accordance with embodiments of the present invention.

With reference to the drawings, a display apparatus in accordance with one embodiment of the present invention may include a curved display module 180 having a curved surface bent in the y-axis direction and a surface overlay 800 or 910 disposed on the front surface of the curved display module 180 and having a refractive index differing from an air layer. In this case, the surface overlay 800 or 910 may be curved.

In a conventional touch recognition method, emitters and receivers are arranged at upper, lower, left, and right edges of a display module 180 or a touch panel and a method in which the emitters at one side project light onto the receivers at the other side is applied to both the x-axis and the y-axis. The quantity of received light is varied according to a degree of blocking an optical path by a hand and x-axis and y-axis coordinates are extracted based on the quantity of light.

In the above-described conventional touch recognition method, in order to recognize x-axis and y-axis coordinates of a touch position, a plurality of an emitter and a receiver in pairs needs to be arranged on both the x-axis and the y-axis. However, in a curved display apparatus bent in the lateral direction (in the y-axis direction), an optical path in the y-axis direction is not form and thus, emitters and receivers in pairs may be installed on the x-axis direction.

Figure 8:
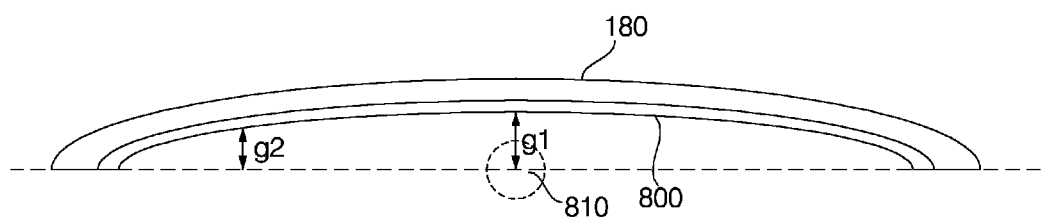
FIGS. 8, 9, 10, 11, 12, 13, 14, 15, 16 and 17 are views illustrating the structures of display apparatuses and methods for operating the same in accordance with embodiments of the present invention.

With reference to FIG. 8, if emitters and receivers are arranged on left and right surfaces, i.e., both side surfaces, and light is emitted, the light travels straightly (shown by a dotted line) and gaps g1 and g2 with a curved touch area 810 are great and thus, accuracy in touch position recognition is lowered and the gap 1 at the central region of the display module 180, frequently touched by users, increases.

Therefore, the present invention provides an IR touch recognition method which enables recognition of x-axis and y-axis touch coordinates at all regions of a curved display apparatus and greatly reduces the number of IR elements without additional use of specific optical elements, such as a lens.

In the method in accordance with the present invention, an optical path may be divided based on differences of refractive indexes using the surface overlay 800 or 910 formed of a transparent material having a refractive index differing from air, such as glass, a film, or polycarbonate (PC) and x-axis and y-axis coordinates may be extracted by receiving divided light. The surface overlay 810 or 910 may be a glass plate, a transparent film, or a transparent light guide plate.

Figure 9:
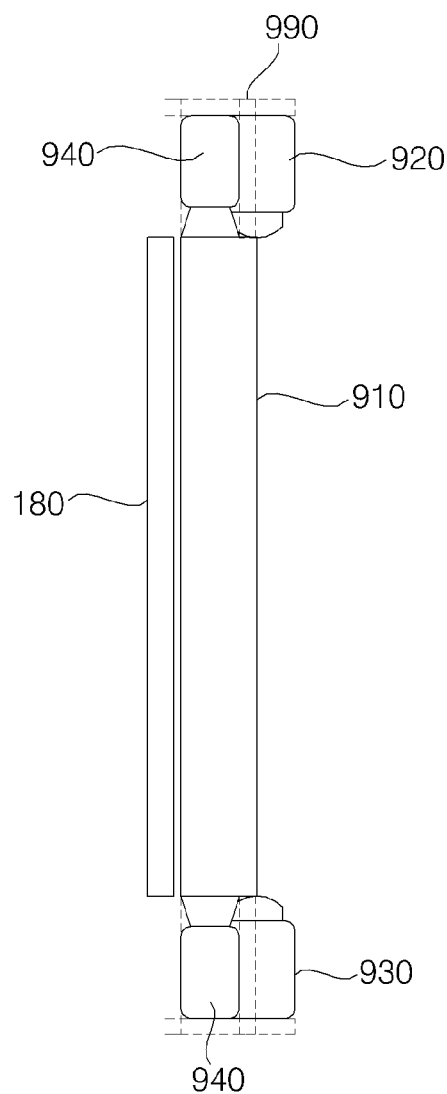
Figure 10:
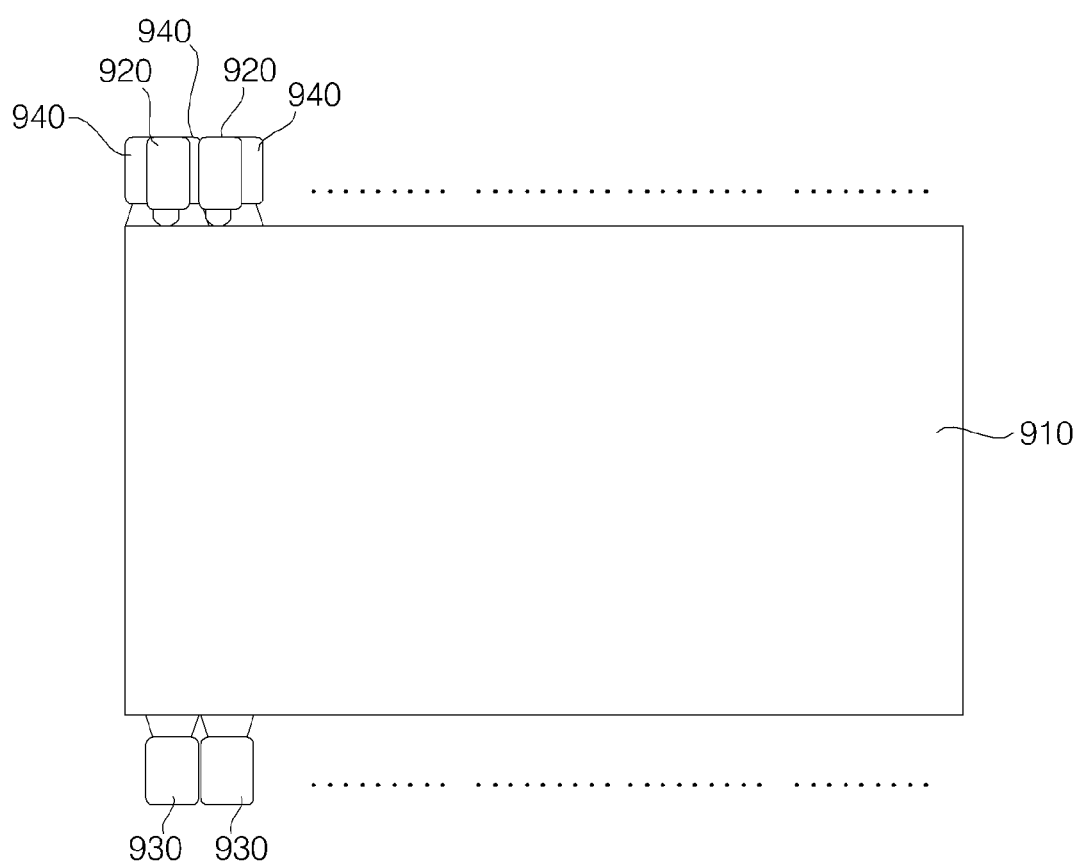

Although FIGS. 9 to 17 respectively illustrate rectangular display modules 180 and surface overlays 910 and FIGS. 11 to 17 are rotated from FIGS. 9 and 10 by 90 degrees so that the vertical direction of FIGS. 9 and 10 becomes the horizontal direction of FIGS. 11 to 17 for convenience of description, embodiments of the present invention are not limited thereto.

FIG. 9 is a side view of a display apparatus in accordance with one embodiment of the present invention and FIG. 10 is a front view of the display apparatus in accordance with this embodiment of the present invention.

With reference to FIGS. 9 and 10, a display apparatus in accordance with one embodiment of the present invention may include a curved display module 180 having a curved surface bent in the y-axis direction, a surface overlay 910 disposed on the front surface of the curved display module 180 and having a refractive index differing from an air layer, at least one IR emitter 920 arranged on the upper long side or the lower long side of the surface overlay 910 and emitting IR light, and at least one first IR receiver 930 arranged on the long side opposite the long side on which the at least one IR emitter 920 is arranged, from among the upper long side and the lower long side of the surface overlay 910 and receiving the IR light emitted by the at least one IR emitter 920.

Further, if a plurality of IR emitters 920 and a plurality of first IR receivers 930 are arranged, the IR emitters 920 and the first IR receivers 930 may be continuously arranged in a line on the upper long side and the lower long side of the surface overlay 910 in the y-axis direction.

The optical path of IR light emitted by the IR emitters 920 may be divided by the surface overlay 910.

Further, the IR emitters 920 may emit a part of the IR light toward the surface overlay 910 and emit the other part of the IR light toward the air layer.

The first IR receivers 930 may receive first light from among IR light emitted by the IR emitters 920 (Operation S710).

In the curved display panel 180 bent in the horizontal direction, i.e., the y-axis horizontal direction, the length of the curved display panel 180 in the y-axis direction is long and the length of the curved display panel 180 in the x-axis direction is short. Therefore, upper and lower sides of the curved display panel 180 and the surface overlay 910 may be referred so as long sides and left and right sides of the curved display panel 180 and the surface overlay 910 may be referred to as short sides.

The IR emitters 920 and the first IR receivers 930 may be arranged on the upper long side and the lower long side of the surface overlay 910 so as to be opposite each other. Light emitted by the IR emitters 920 may travel straightly by the length of the short sides of the surface overlay 910 in the x-axis direction and be received by the first IR receivers 930.

The first IR receivers 930 may receive a part of light emitted by the IR emitters 920, i.e., first light, via the air layer. That is, the first light may be light passed through the air layer from among the light emitted by the IR emitters 920.

With reference to FIGS. 9 and 10, the display apparatus in accordance with this embodiment of the present invention may further include second IR receivers 940 arranged in pairs on the upper long side and the lower long side of the surface overlay 910.

The second IR receivers 940 may be continuously arranged in a line on the upper long side and the lower long side of the surface overlay 910 in the y-axis direction.

The second IR receivers 940 may receive second light having a different optical path from the first light, from among IR light emitted by the IR emitters 920 (Operation S720).

The second IR receivers 940 may receive light emitted from the IR emitters 920 via the surface overlay 910. Therefore, the second light may be light passed through the surface overlay 910 disposed on the front surface of the curved display module 180 and having a refractive index differing from the air layer.

Figure 11:
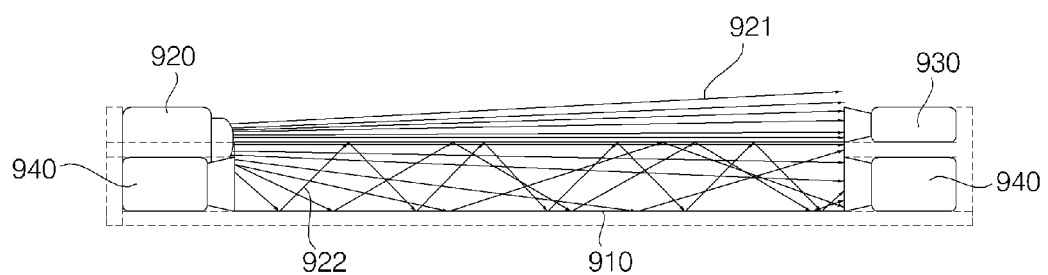
Figure 12:
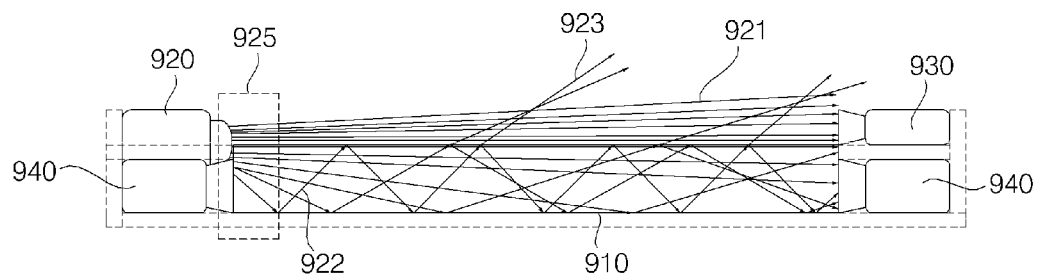

FIGS. 11 and 12 illustrate examples of division of an optical path due to a difference of refractive indexes between the air layer and the surface overlay 910.

With reference to FIGS. 11 and 12, the IR emitters 920 may be arranged so that a part of light emitted by the IR emitters 920 may travel straightly toward the surface overlay 910 and the other part of light emitted by the IR emitters 920 may pass through the air layer.

As exemplarily shown in FIGS. 11 and 12, the central line of a light output part of the emitter 920 may coincide with the end line of the surface overlay 910 so that a ratio of light passed through the air layer to light passed through the overlay 910 may become 1:1.

The emitters 920 uniformly emit light through a front end 925 of the output part, but the optical path may be divided due to a difference of refractive indexes between the air layer and the surface overlay 910 and the light may reach the first receivers 930 and the second receivers 940 through different optical paths.

For example, if the surface overlay 910 is formed of glass having a refractive index of 1.45, the air layer has a refractive index of 1.0003 and thus light passing through the surface overlay 910 may become relatively slow and be much refracted. Thereby, light emitted by the emitters 920 has different optical paths according to media through which the light passes.

Further, lights entering the surface overlay 910 may reach the second receivers 940 using total internal reflection (TIR). TIR is a phenomenon in that, when light is incident from a medium of a high concentration upon a medium of a low concentration, i.e., incident from a medium having a high refractive index upon a medium having a low refractive index, for example, when light is incident from the surface overlay 910 formed of glass upon an air layer, the light is totally reflected on a boundary if an incident angle is greater than a critical angle.

Based on TIR, a part 922 of light passing through the surface overlay 910 may reach the second receivers 940 and the other part 923 may travel toward an area in front of the display module 180 and the surface overlay 910.

The touch recognition unit 171 or the controller 170 may calculate an x-axis coordinate of a touch position based on change of the quantity of light received by the first IR receivers 930 (Operation S730).

Figure 13:
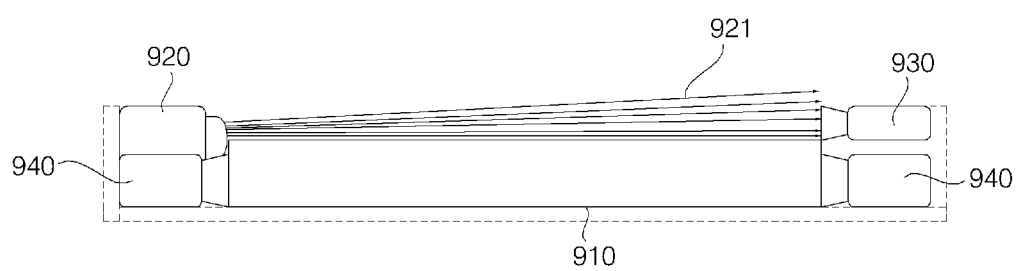
Figure 14:
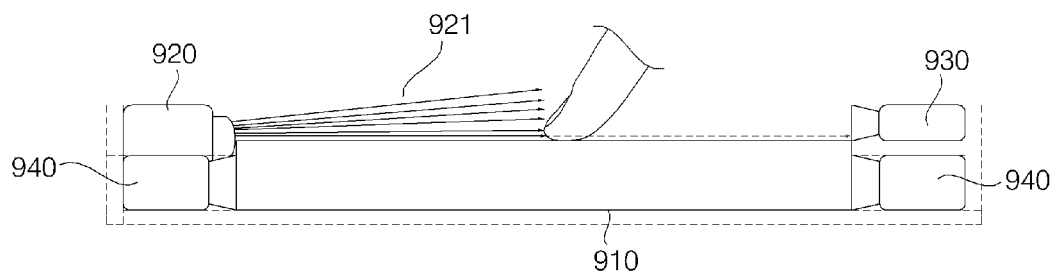

FIGS. 13 and 14 illustrate examples of extraction of the X-axis coordinate of the touch position using first light having an optical path reaching the first IR receivers 930 via the air layer from the IR emitters 920.

With reference to FIG. 13, first infrared light 921 emitted toward the air layer by the IR emitters 920 has straightness, and is thus not blocked and may be received by the first IR receivers 930 unless touch occurs.

However, as exemplarily shown in FIG. 14, if a touch operation using a user finger or a pen is performed, the first light 921 passing through a touch position is blocked and thus, the first light 921 is not received by the first IR receivers 930 or the quantity of the first light 921 received by the first IR receivers 930 is greatly reduced.

The touch recognition unit 171 or the controller 170 may recognize the x-axis coordinate of the touch position using straightness of light and a degree of blocking light.

Based on change of the quantity of light received by the first IR receivers 930, if change of the quantity of light is more than a reference value, the touch recognition unit 171 or the controller 180 may recognize an x-axis coordinate corresponding to the position of the first IR receiver 930 having a quantity of light less than the reference value as the x-axis coordinate of the touch position.

The touch recognition unit 171 and the controller 170 may calculate a y-axis coordinate of the touch position based on change of the quantity of light received by the second IR receivers 940 (Operation S740).

The touch recognition unit 171 and the controller 170 may calculate the y-axis coordinate of the touch position based on change of the quantity of light received by the second IR receivers 940 or calculate the y-axis coordinate of the touch position based on a light ratio between an idle state and a touch state of the quantity of light received by the second IR receivers 940.

Figure 15:
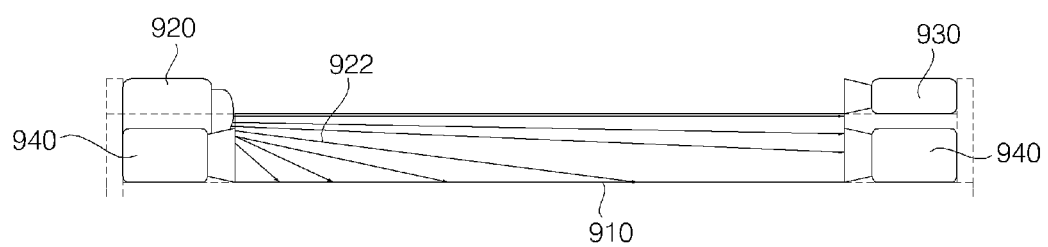
Figure 16:
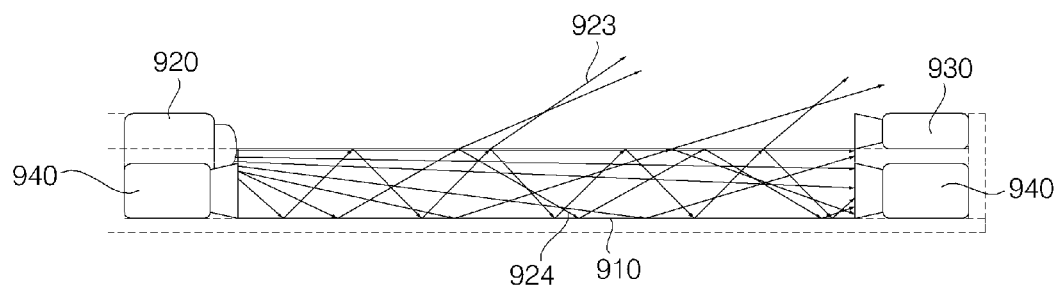
Figure 17:
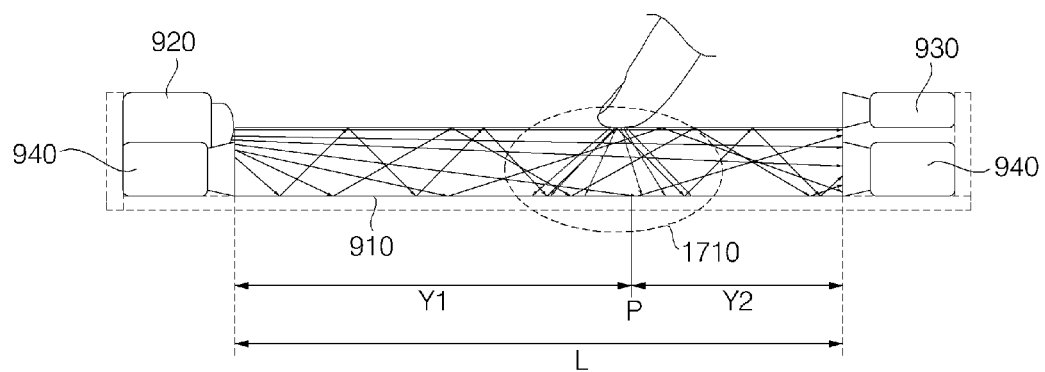

FIGS. 15 to 17 illustrate examples of extraction of the y-axis coordinate of the touch position using second light having an optical path reaching the second IR receivers 930 via the surface overlay 910 from the IR emitters 920.

With reference to FIGS. 15 to 17, the second IR receivers 940 are arranged in pairs on the upper and lower sides of the surface overlay 910 and receive light for extracting the y-axis coordinate of the touch position.

Light 922 entering the surface overlay 910 may be totally internally reflected due to a difference of refractive indexes between a medium having a high concentration, i.e., the surface overlay 910, and a medium having a low concentration, i.e., the air layer.

For example, if the surface overlay 910 is formed of glass having a refractive index of 1.45 and the air layer has a refractive index of 1.0003, light incident from the surface overlay 910 upon the air layer at an incident angle greater than a critical angle of about 43 degrees may be reflected at the boundary between the surface overlay 910 and the air layer. Light may be widely distributed in the surface overlay 910 and lights acquired by TIR may reach the second IR receivers 940 on both sides of the surface overlay 910. That is, light inserted into the surface overlay 910 formed of glass is totally internally reflected and thus frustrated.

Light 923 having an incident angle less than the critical angle may travel toward an area in front of the display module 180 and the surface overlay 910.

With reference to FIG. 17, when a touch operation 1710 using a user finger or a pen is performed, TIR of light may be performed in a frustrated total internal reflection (FTIR) method. The quantity of light totally reflected and concentrated may be greatly increased due to the refractive index of the finger.

That is, as exemplarily shown in FIG. 7, the amount of light 923 moving from the surface overlay 910 to the air layer is reduced and light 924 totally internally reflected in the surface overlay 910 tends to be concentrated onto one position.

The second IR receivers 940 sense these lights and may thus measure change of the quantity of light, and the touch recognition unit 171 and the controller 170 may calculate the y-axis coordinate Y1 and/or Y2 of the touch position based on the change of the quality of light received by the second IR receivers 940.

Further, the touch recognition unit 171 and the controller 170 may calculate the y-axis coordinate of the touch position based on change of the quantity of light received by the second IR receivers 940 or calculate the y-axis coordinate Y1 and/or Y2 of the touch position based on a light ratio between an idle state and a touch state of the quantity of light received by the second IR receivers 940.

Even in the idle state in which there is no touch input, the surface overlay 910 contains a designated quantity of light due to TIR and, in the touch state in which a user touches the display module by a finger, a human skin has a refractive index of about 1.35 to 1.40 and thus, light toward the user finger may be scattered and concentrated at a specific position and the quantity of light in the surface overlay 910 may be changed.

The second IR receivers 940 in pairs sense light distributed in the surface overlay 910 in the idle state, i.e., in a section in which there is no touch input by a user finger, etc., and sense light scattered and concentrated at a specific position in the touch state, i.e., in a section in which there is touch.

The touch recognition unit 171 or the controller 170 may calculate the y-axis coordinate of the touch position based on a light ratio between the idle state and the touch state.

If one of second IR receivers 940 provided in a pair is referred to as a receiver A and the other is referred to as a receiver B, a quantity of light received by the receiver A, measured in the idle state, is defined as $I_{Ai}$, a quantity of light received by the receiver B, measured in the idle state, is defined as $I_{Bi}$, a quantity of light received by the receiver A, measured in the touch state, is defined as $I_{At}$, and a quantity of light received by the receiver B, measured in the touch state, is defined as $I_{Bt}$.

Then, change values ΔA and ΔB of the quantities of the receivers A and B in the idle state and the touch state will be calculated by Equations 3 and 4 below.

$$\Delta A = I_{At} - I_{Ai} \quad \text{[Equation 3]}$$

$$\Delta B = I_{Bt} - I_{Bi} \quad \text{[Equation 4]}$$

By applying the acquired change values ΔA and ΔB to Equation 5 below, a y-axis coordinate P of the touch position may be calculated.

$$P = Y_{max} \times \Delta A / (\Delta A + \Delta B) \quad \text{[Equation 5]}$$

Here, Ymax is multiplication of a distance L between the receivers A and B and a scaling factor determined based on resolution of the display apparatus.

In a display apparatus in accordance with one embodiment of the present invention, a curved display module bent in the y-axis direction (lateral direction) may be provided and light emitting elements and light receiving elements may be arranged only on the upper long side and the lower long side of a surface overlay.

Thereby, the number of the used light emitting elements and the number of the used light receiving elements may be reduced, and light used in touch recognition is emitted in the x-axis direction (vertical direction) having a relatively low refractive index and small length and thus an error in touch position recognition may be reduced.

In accordance with the embodiment of the present invention, touch input is more accurately and effectively recognized even in a curved display apparatus and thus, user convenience may be improved.

In accordance with the embodiment of the present invention, a curved display apparatus enabling touch recognition may be manufactured in low costs.

The configurations and methods of display apparatuses in accordance with the above-described embodiments of the present invention are not limited and all or some of the respective embodiments may be combined so that various modifications are possible.

The method of operating the display apparatus of the present invention may be implemented as code readable by a processor provided in the display apparatus in a recording medium readable by the processor. The recording medium readable by the processor may be any kind of recording device in which data readable by the processor are stored. For example, the recording medium readable by the processor may include a ROM, a RAM, a CD-ROM, a magnetic tape, a floppy disk, an optical data storage medium, or a carrier wave, such as data transmission over the Internet. Further, since the recording medium readable by the processor may be distributed in a computer system connected through a network, code readable by the processor in a distributed manner may be stored and executed.

As apparent from the above description, in accordance with one embodiment of the present invention, an image of a wide viewing angle and high quality may be displayed on a curved display apparatus.

In accordance with one embodiment of the present invention, touch input may be more accurately and effectively recognized even in a curved display apparatus and thus, user convenience may be improved.

In accordance with one embodiment of the present invention, a curved display apparatus enabling touch recognition may be manufactured in low costs.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A display apparatus comprising:
    a curved display module having a curved surface bent in a y-axis direction;
    a surface overlay disposed on a front surface of the curved display module and having a refractive index differing from an air layer;
    at least one infrared (IR) emitter arranged on an upper long side or a lower long side of the surface overlay and emitting first light of IR light toward the air layer and second light of the IR light toward the surface overlay;
    at least one first IR receiver arranged on the long side such that the at least one first IR receiver is located at an opposite side of the at least one IR emitter, the at least one first IR receiver receiving the first light through the air layer; and
    second IR receivers arranged in pairs such that one of the pairs is located on the upper long side and the other one of the pairs is located on the lower long side of the surface overlay, the second IR receivers receiving the second light through the surface overlay,
    wherein an x-axis coordinate of a touch position on the surface overly is calculated based on a change of a quantity of light received by the at least one first IR receiver, and
    wherein a y-axis coordinate of the touch position is calculated based on a change of a quantity of light received by the second IR receivers.

2. The display apparatus according to claim 1, wherein an optical path of the IR light emitted by the at least one IR emitter is divided by the surface overlay.

3. The display apparatus according to claim 1, further comprising a plurality of IR emitters and a plurality of first IR receivers, wherein the plurality of IR emitters and the plurality of first IR receivers are arranged in a line on the upper long side and the lower long side of the surface overlay in the y-axis direction.

4. The display apparatus according to claim 1, wherein the second IR receivers are arranged in a line on the upper long side and the lower long side of the surface overlay in the y-axis direction.

5. The display apparatus according to claim 1, wherein, in the calculation of the y-axis coordinate, the y-axis coordinate of the touch position is calculated based on a light ratio between an idle state and a touch state of the quantity of light received by the second IR receivers.

6. The display apparatus according to claim 1, wherein the surface overlay is one of a glass plate, a transparent film, or a transparent light guide plate.

7. A method for operating a display apparatus having a curved display module having a curved surface bent in a y-axis direction, wherein a surface overlay is disposed on a front surface of the curved display module and having a refractive index differing from an air layer, the method comprising:

receiving, via at least one first infrared (IR) receiver, first light passed through the air layer from among IR light emitted by at least one IR emitter, the first light of the IR light emitted by the at least one IR emitter toward the air layer, wherein the at least one first IR receiver is arranged on an upper long side or a lower long side of the surface overlay;

receiving, via second IR receivers, second light through the surface overlay from among the IR light, the second light having an optical path differing from the first light, the second light of the IR light emitted by the at least one IR emitter toward the surface overlay, wherein the second IR receivers are arranged in pairs such that one of the pairs is located on the upper long side and the other one of the pairs is located on the lower long side of the surface overlay;

calculating an x-axis coordinate of a touch position on the surface overlay based on a change of a quantity of light received by the at least one first IR receiver; and calculating a y-axis coordinate of the touch position based on a change of a quantity of light received by the second IR receivers.

8. The method according to claim 7, wherein, in the calculation of the y-axis coordinate, the y-axis coordinate of the touch position is calculated based on a light ratio between an idle state and a touch state of the quantity of light received by the second IR receivers.

9. The method according to claim 7, wherein an optical path of the IR light emitted by the at least one emitter is divided by the surface overlay.

10. The method according to claim 9, wherein the at least one IR emitter is arranged on the upper long side or the lower long side of the surface overlay.

11. The method according to claim 9, wherein the at least one first IR receiver is arranged on the long side such that the at least one first IR receiver is located at an opposite side of the at least one IR emitter.

* * * * *